United States Patent [19]

Fink

[11] Patent Number: 4,798,952

[45] Date of Patent: Jan. 17, 1989

[54] ASTABLE RESONATOR PHOTONEUTRALIZATION APPARATUS

[75] Inventor: Joel H. Fink, Hayward, Calif.

[73] Assignee: The United States of America as represented by the United States Department of Energy, Washington, D.C.

[21] Appl. No.: 51,561

[22] Filed: May 19, 1987

[51] Int. Cl.[4] .............................................. G01N 27/78

[52] U.S. Cl. .................................. 250/251; 250/423 P

[58] Field of Search ............... 250/251, 423 R, 423 P, 250/492.1

[56] References Cited

U.S. PATENT DOCUMENTS 3,562,530 2/1971 Consoli et al. ...................... 250/251

4,047,026 9/1977 Bjorkholm et al. ................. 250/251

4,140,576 2/1979 Fink et al. ........................... 250/251

4,189,646 2/1980 Vanderleeden ................. 250/423 P 4,649,273 3/1987 Chutjian et al. ................ 250/423 P

FOREIGN PATENT DOCUMENTS 2138626 10/1984 United Kingdom ............ 250/423 P

*Primary Examiner*—Bruce C. Anderson

*Assistant Examiner*—Paul A. Guss

*Attorney, Agent, or Firm*—John F. Schipper; L. E. Carnahan; Judson R. Hightower

[57] ABSTRACT

Apparatus for photoneutralization of negatively charged atomic or molecular particles, using multiple passes of electromagnetic radiation of predetermined wavelength.

29 Claims, 5 Drawing Sheets

PHOTONEUTRALIZATION APPARATUS

The U.S. Government has rights in this invention pursuant to Contract No. W-7405-ENG-48 between the U.S. Department of Energy and the University of California for the operation of the Lawrence Livermore National Laboratory.

FIELD OF THE INVENTION

This invention relates to production of energetic neutral particle beams and, more particularly, to photoneutralization apparatus for removing electrons from energetic, negatively charged particles in atomic and molecular beams.

BACKGROUND OF THE INVENTION

Photoneutralization of positively charged atoms and molecules, as a means of forming nigh kinetic energy neutral beams, was investigated ten years ago for use in magnetic fusion. This approach has developed slowly, if at all, in the sunsequent years, due to lack of sufficient development of the required laser and optical systems. The subject invention offers improvements in the optical system efficiency of photoneutralization apparatus.

Of all the methods for producing high energy neutral beams, photoneutralization of energetic negative ions is the most attractive. Neutralization efficiencies of 80-85 percent are routinely achieved with little or no degradation of the kinetic energy of the beam particles and with production of only a small percentage of impurities. Additionally, photoneutralization costs are $1-$2 per watt of neutral beam output.

Photoneutralization was first proposed by the inventor hereof in 1975 as a means of forming neutral beams for magnetic fusion (J. H. Fink and A. M. Frank, UCRL-16844, LLL Report (1975) ). At that time, the inventor hereof proposed use of solid state gallium arsenide lasers to strip the excess electrons from the negative ions in a multi-pass arrangement within an optical cavity. A gallium arsenide laser is attractive because the light emitted (at $\lambda=0.85$ $\mu$m) is close to the wavelength for maximum photoneutralization cross section of a number of negative ions such as $H^-$ and $C^-$, as indicated in FIG. 4. A gallium arsenide laser operates at efficiencies of 20-40 percent, which is also quite attractive. However, gallium arsenide lasers may still require considerable development before they can be used reliably in any application. Among other things, such a laser must operate efficiently at room temperature, with an angular divergence that is greatly reduced from the present divergence of such lasers.

Another attractive laser, which has received far more development in the last eight years, is atomic iodine, which emits radiation at a wavelength $\lambda=1.31$ $\mu$m. This wavelength is not substantially coincident with the wavelength of maximum photoneutralization cross section for any of the negative ions mentioned above; but the associated photoneutralization cross section at the iodine emission wavelength is about half of its maximum value, and the use of such an infrared wavelength is less likely to produce undesirable impurities in the laser gas. Further, an atomic iodine laser has an associated efficiency of operation of 7-11 percent, which is respectable.

The maximum photoneutralization cross section for negative ions is of the order of $\sigma_{ph}=10^{-17}$ cm$^2$. With a beam charged particle density of, say, $n=10^{15}$ cm$^{-3}$ present, the characteristic absorption length for the photoneutralization process is $d=(n\sigma)^{-1}=100$ cm. Therefore, if one is to ensure virtually complete use of the photoneutralization laser radiation, this radiation must travel 460 cm or more within the portion of the space through which the charged particles pass. This appears to require multiple passage of the radiation through the portion of the space through which the charged particles pass, to assure reasonably complete (99 percent) absorption of the photoneutralization radiation.

SUMMARY OF THE INVENTION

It is an object of this invention to provide apparatus for efficient photoneutralization of energetic atomic and molecular beams of negatively charged particles.

It is another object of this invention to provide apparatus for removing one or more electrons from negatively charged atomic and molecular beams so that the kinetic energy of the beam particles is relatively undisturbed by such removal.

Additional objects, novel features and advantages thereof are set forth in the detailed description and may be realized by means of the instrumentalities and combinations set forth in the appended claims.

The subject invention is apparatus for photoneutralization of an atomic or molecular beam of negatively charged particles that does not appreciably disturb the kinetic energy of the beam particles. To achieve the foregoing objects in accordance with the subject invention, the apparatus in one embodiment may comprise: an optical cavity including two end walls and a longitudinal axis therebetween; first and second, substantially identical convex mirrors, spaced apart within the cavity and facing one another along the cavity longitudinal axis, with the mirrors being adjacent to but spaced apart from the respective end walls of the cavity; first and second concave mirrors, positioned, respectively, at the first and second end walls within the cavity and facing one another and arranged so that an electromagnetic ("em.") radiation beam that leaves one convex mirror and passes adjacent to, but avoids reflection by, the other convex mirror is reflected by the concave mirror adjacent to the other convex mirror and returns to the first-mentioned convex mirror; ;an optical gain cavity that includes the first end wall and the first convex mirror; a photoneutralization region that includes the second end wall and the second convex mirror, with the optical gain cavity being separated from the photoneutralization region by an optical window that is transparent to em. radiation at wavelength $\lambda=\lambda_r$; gas excitation means, operatively associated with the optical gain cavity, to excite a gas contained in this cavity; gas source and inflow/outflow means operatively associated with and adjacent to the optical gain cavity, to make gas available for, admit gas into, and allow gas to exit from, the optical gain cavity, where the gas is chosen to permit emission of em. radiation of wavelength $\lambda_r$ when the gas is excited by the gas excitation means; an em. radiation beam source and beam input means, operatively associated with the optical cavity, to produce an em. radiation beam of wavelength substantially $\lambda_r$ and to direct this beam into the optical cavity; and a charged particle beam source and beam input means, positioned adjacent to the optical cavity and oriented to produce and direct a beam of negatively charged atomic or molecular particles through the photoneutralization region in a direction substantially transverse to the direction of the longitudinal axis of the optical cavity.

A second embodiment of the invention is similar to the first embodiment, except that the positions of the convex mirrors and the positions of the concave mirrors are exchanged and each concave mirror is provided with a centrally located aperture therein to permit illumination of the adjacent convex mirror by the em. radiation beam.

A third embodiment may comprise: an optical gain cavity having two substantially parallel end walls spaced apart with a longitudinal axis therebetween; a first mirror, substantially fully reflecting at wavelength $\lambda=\lambda_r$, positioned at the first end wall of the gain cavity; a planar window, at least partially transparent to electromagnetic radiation of wavelength $\lambda_r$, positioned at the second end wall of the gain cavity so that the window and the mirror face one another along the longitudinal axis of the gain cavity; a second planar mirror, spaced apart from the optical gain cavity and positioned so that the planar window is positioned between the first and second planar mirrors, with the plane of the second mirror being oriented to receive and reflect, in a direction different from that of the optical gain cavity longitudinal axis, any electromagnetic radiation issuing from the planar window and propagating substantially parallel to the optical gain cavity longitudinal axis, and the second mirror being substantially fully reflecting for electromagnetic radiation of wavelength $\lambda_r$; a third planar mirror generally facing the second mirror and being spaced apart therefrom so that electromagnetic radiation that propagates parallel to the optical gain cavity longitudinal axis toward the second mirror will be reflected from the second mirror, will proceed toward the third mirror and will be reflected at substantially perpendicular incidence by the third mirror; an optical cavity including the optical gain cavity and the second and third planar mirrors; gas excitation means to excite a gas contained in the optical gain cavity; optical gain gas source and gas inflow/outflow means, operatively associated with and adjacent to the optical gain cavity, to provide gas for, admit gas into, and allow gas to exit from, the optical gain cavity, where the gas is chosen so that it emits electromagnetic radiation of wavelength $\lambda_r$ when the gas is excited by the gas excitation means; an electromagnetic radiation beam source and beam input means, operatively associated with the optical cavity, to produce an electromagnetic radiation beam of wavelength substantially $\lambda=\lambda_r$ and to direct this radiation beam into the optical cavity substantially parallel to the optical gain cavity longitudinal axis; and a charged particle beam source and beam input means, positioned adjacent to the optical cavity and oriented to produce and direct a beam of negatively charged atomic or molecular particles through the optical cavity in a direction substantially transverse to the direction of the optical gain cavity longitudinal axis.

A fourth embodiment may comprise: an optical gain cavity of generally annular shape, defined by the volume between two coaxial right cylinders of radii $R_1$ and $R_2$, with $R_1<R_2$; a substantially planar mirror of generally annular shape, positioned at a first end of the optical gain cavity, that is substantially fully reflecting for electromagnetic radiation of predetermined wavelength $\lambda=\lambda_r$; a planar window of generally annular shape, positioned at a second end of the optical gain cavity, that is at least partially transparent for electromagnetic radiation of wavelength $\lambda_r$; a first substantially conical mirror wnose axis is substantially coincident with the common cylinder axis, spaced apart from and positioned substantially facing the optical gain cavity along a line parallel to the common cylinder axis so that the planar window is positioned between the planar mirror and the first conical mirror, with the plane of the first conical mirror being oriented to receive and reflect, in a direction different from that of the common cylinder axis, any electromagnetic radiation issuing from the optical gain cavity and propagating substantially parallel to the common cylinder axis, with the first conical mirror being substantially fully reflecting for electromagnetic radiation of wavelength $\lambda_r$; a second substantially conical mirror whose axis is substantially coincident with the common cylinder axis, spaced apart from and positioned substantially facing the first conical mirror, with the plane of this second conical mirror being oriented to receive and reflect at perpendicular incidence any electromagnetic radiation that issues from the optical gain cavity, propagates substantially parallel to the common cylinder axis and is reflected by the first conical mirror, with this second conical mirror being substantially fully reflecting for electromagnetic radiation of wavelength $\lambda_r$; an optical cavity including the optical gain cavity and the first and second conical mirrors; gas excitation means, operatively associated with the optical gain cavity to excite a gas contained in this cavity; an optical gain gas source and gas inflow/-outflow means, operatively associated with and adjacent to the optical gain cavity, to provide gas for, admit gas into and allow gas to exit from, the optical gain cavity, where the gas is chosen to permit emission of electromagnetic radiation of wavelength $\lambda_r$ when the gas is excited by the gas excitation means; an electromagnetic radiation beam source and beam input means to produce an electromagnetic radiation beam of wavelength substantially $\lambda_r$ and to direct this radiation beam into the optical cavity in a direction substantially parallel to the common cylinder axis; a charged particle beam source and beam input/output means, positioned adjacent to the optical cavity and oriented to produce and direct a beam of negatively charged atomic or molecular particles through the optical cavity in a direction substantially transverse to the direction of the common cylinder axis.

The invention in a fifth embodiment may comprise: an optical gain cavity of generally annular shape, defined by the volume between two cones that are spaced apart and have the same cone apex half angle $\Theta$, with $0<\theta<\pi/4$ radians, the two cones having a common cone axis and common orientation; a first substantially conical mirror of generally annular shape, positioned at and defining a first end wall of the optical gain cavity, that is substantially fully reflecting for electromagnetic radiation of predetermined wavelength $\lambda=\lambda_r$; a substantially conical window, positioned at and defining a second end wall of the optical gain cavity, that is at least partially transparent for electromagnetic radiation of wavelength $\lambda_r$, with the first conical mirror and the conical window facing one another and the local normals to the surfaces of the first conical mirror and of the conical window each being substantially parallel to the local generators of the two cones that define the optical gain cavity; a substantially planar mirror, spaced apart from and positioned substantially facing the optical gain cavity along lines parallel to the local normal to the surface of the first conical mirror so that the conical window is positioned between the first conical mirror and the planar mirror, with the plane of the planar mirror being oriented to receive and reflect, in a direction different from that of the local normal to the surface of the first conical mirror, any electromagnetic radiation issuing from the optical gain cavity and propagating substantially parallel to this local normal, with the planar mirror being substantially fully reflecting for electromagnetic radiation of wavelength $\lambda_r$; a second substantially conical mirror, spaced apart from and positioned substantially facing the planar mirror and having cone half angle substantially $\pi/2-\theta$, with the first and second conical mirrors having substantially coincident cone axes and these cone axes being substantially perpendicular to the plane of the planar mirror and with the second conical mirror being oriented to receive and reflect at perpendicular incidence any electromagnetic radiation that issues from the optical gain cavity, propagates substantially parallel to the local normal to the surface of the first conical mirror, and is reflected by the planar mirror, with the second conical mirror being substantially fully reflecting for electromagnetic radiation of wavelength $\lambda_r$; an optical cavity including the optical gain cavity, the planar mirror and the second conical mirror; gas excitation means to excite a gas contained in the optical gain cavity; an optical gain gas source and gas inflow/outflow means, operatively associated with and adjacent to the optical gain cavity, to provide gas for, admit gas into and allow gas to exit from, the optical gain cavity, where the gas is chosen to emit electromagnetic radiation of wavelength $\lambda_r$ when the gas is excited by the gas excitation means; an electromagnetic radiation beam source and beam input means, operatively associated with the optical cavity, to produce an electromagnetic radiation beam of wavelength substantially $\lambda_r$ and to direct this radiation beam into the optical cavity in a direction substantially parallel to the direction of the optical gain cavity longitudinal axis; and a charged particle beam source and beam input means, positioned adjacent to the optical cavity to produce and direct a beam of negatively charged atomic or molecular particles through the optical cavity in a direction substantially transverse to the direction of the optical gain cavity longitudinal axis.

DETAILED DESCRIPTION

Figure 1:
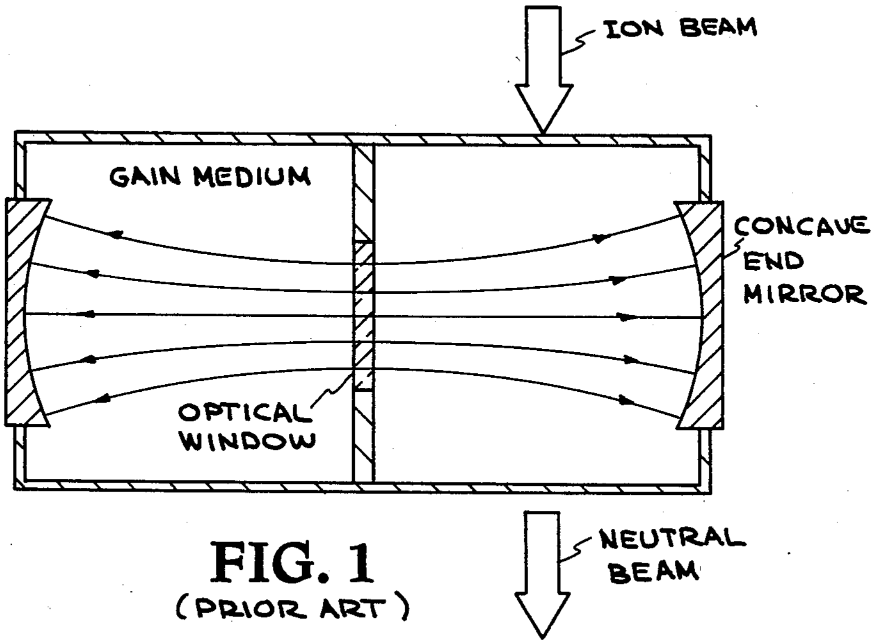
FIG. 1 (PRIOR ART)
FIGS. 1 and 2 are schematic representations of earlier approaches to multipass laser irradiation in a laser cell.

FIG. 1 illustrates one prior approach to multiple passage of the laser beam through the ion beam, using a stable resonator comprising two concave mirrors with an excitable gain medium positioned therebetween and the charged particle beam passing transversely through the gain cell. A typical laser stripping cell design includes very large radii end mirrors and consequently a large cavity for the gain medium. It is disadvantageous to operate large volumes of a chemical laser medium, and the optical effects of large mirrors can create an optical "waist" or minimum in the beam radius, thereby limiting the laser medium volume available for power gain.

Figure 2:
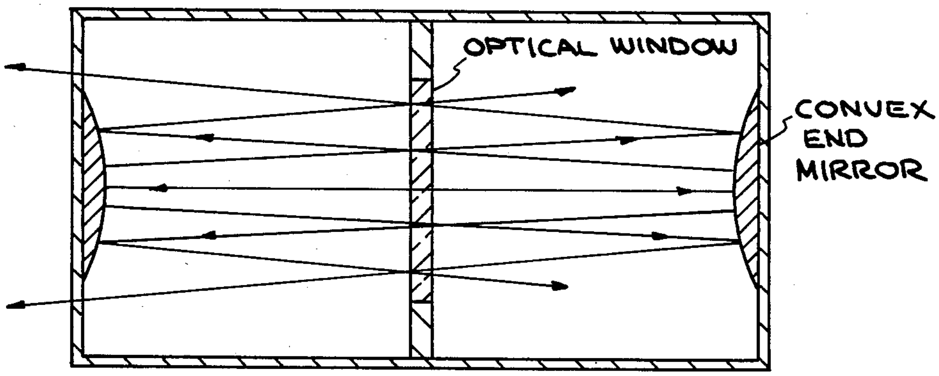
FIG. 2 (PRIOR ART)

FIG. 2 illustrates an alternative approach, using a laser with an unstable resonator including two convex mirrors that spread the light into a larger volume of gain medium than is available in a stable resonator. This produces a larger power gain, but the diverging laser light is lost from the resonator too quickly to be focused for decent efficiency of photoneutralization.

Figure 3:
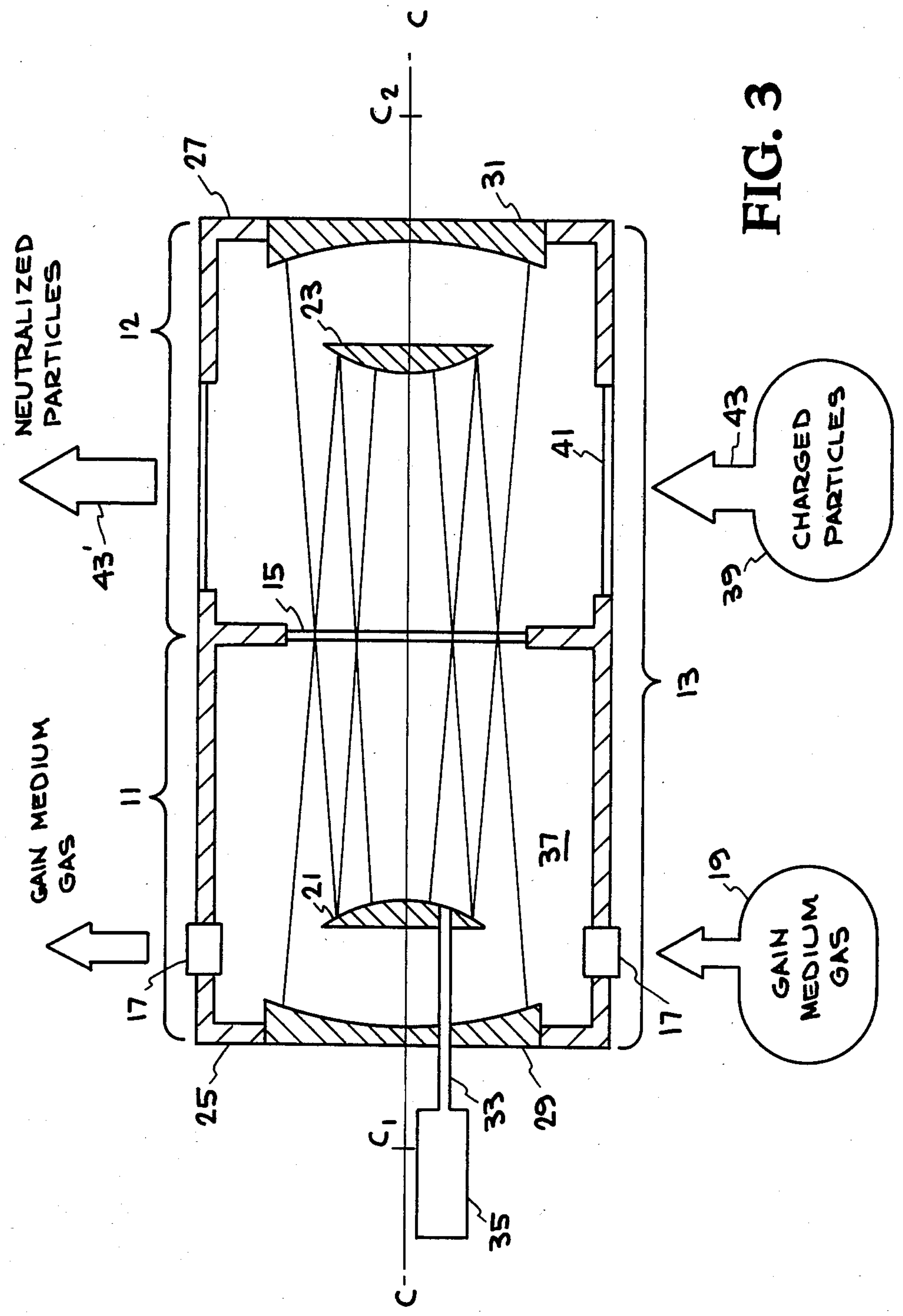
FIG. 3 is a schematic view of the apparatus of the subject invention according to one preferred embodiment of the invention.

FIG. 3 snows a schematic view of one embodiment of the subject invention. The apparatus comprises: an optical gain medium cavity 11 that is positioned at one end of and forms a part of laser optical cavity 13, with the optical gain medium cavity portion being separated from the remainder of the optical cavity by an optical window 15 that is transparent to radiation at a predetermined wavelength $\lambda=\lambda_L$; gas inflow/outflow means 17 to admit a gas into the optical gain medium cavity and to allow gas to exit from the optical gain medium cavity, respectively; a source 19 of predetermined gain medium gas operatively associated with the gas inflow/outflow means; first and second, substantially identical convex mirrors 21 and 23, spaced apart within the optical cavity 13 and facing one another along a longitudinal axis CC joining two end walls 25 and 27 of the optical cavity, with the first convex mirror 21 being spaced apart a small distance from the adjacent end wall 25 and the second convex mirror 23 being spaced apart a small distance from the adjacent end wall 27; first and second, substantially identical concave mirrors 29 and 31, positioned at the respective end walls 25 and 27 and facing one another along the axis CC; electromagnetic radiation beam input means 33 and radiation beam source 35 for generating and introducing an electromagnetic radiation beam of predetermined wavelength $\lambda=\lambda_L$ between the two concave mirrors so that the radiation will move away from one end wall toward the other end wall substantially parallel to the axis CC; a predetermined optical gain gas 37 introduced into the optical gain medium cavity 11; and a charged particle beam source 39 and beam input means 41, positioned adjacent to the optical cavity 13 and oriented to produce and direct a beam 43 of negatively charged particles through a photoneutralization region 12 of the optical cavity, which includes no part of the optical gain medium cavity 11, in a direction substantially transverse to the direction of the optical cavity axis CC.

Figure 4:
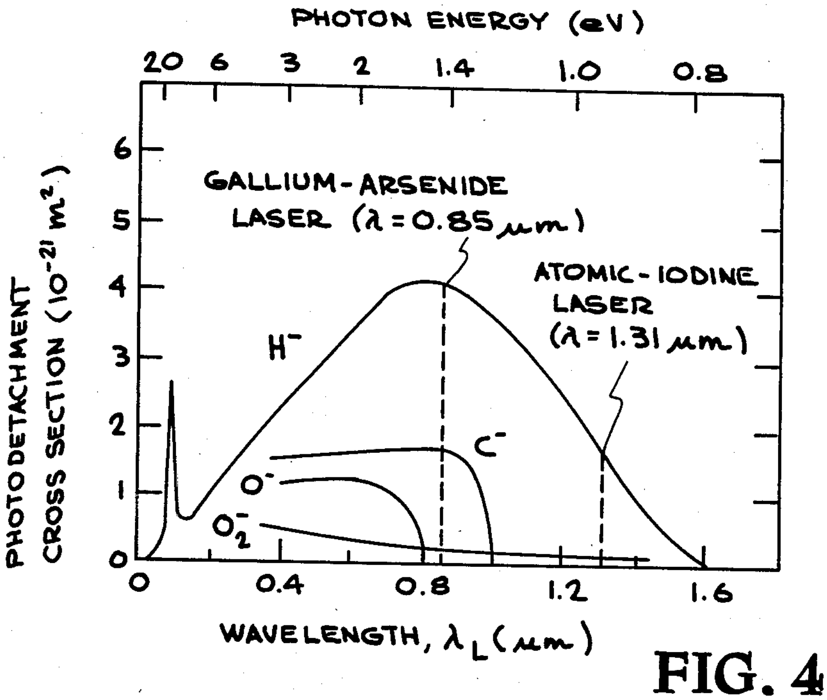
FIG. 4 is a graphical presentation of the cross-section for photoneutralization of four negatively charged particles of interest, as a function of wavelength of the electromagnetic radiation used for removal of the extra electron.

As a representative charged particle (here assumed to be a neutral particle with an additional electron attached) in the beam 43 passes through the photoneutralization region 12, the additional electron will with high probability be removed by interaction with the em. radiation beam by a reaction such as $$(\text{neutral})^- + h\nu_L \rightarrow (\text{neutral}) + e^- + \Delta E, \quad (1)$$

where $(\text{neutral})^-$ represents the neutral particle with the additional electron attached. FIG. 4 graphically presents the photodetachment cross section $\sigma_{ph}$ as a function of radiation wavelength $\lambda_L$ for the reaction indicated in Eq. (1) for the charged particles $H^-$, $C^-$, $O^-$and $O^-{}_2$. This reaction produces a substantially neutral particle beam (43' in FIG. 3) with substantially undiminished kinetic energy, apart from the infinitesimal loss of mass through photodetachment of the additional electron on most of the initially charged particles.

Each of the two convex mirrors 21 and 23 may be a portion of a sphere or cylinder with a predetermined first radius $R_1$; each of the two concave mirrors 29 and 31 may be a portion of a sphere or cylinder with predetermined radius $R_2 \geqq R_1$; the reflecting surface of the first convex mirror 21 may be spaced apart from the reflecting surface of the second concave mirror 31 by a distance $R_2$-$R_1$; and the second convex mirror 23 may be spaced apart from the reflecting surface of the first concave mirror 29 by a distance $R_2$-$R_1$. With the mirrors positioned in this manner, if an em. beam leaves, say, the mirror 21 and travels towards the end wall 27, the beam will be reflected from the mirror 23 or will move past the mirror 23 and be reflected by the mirror 31. If the beam is reflected from 23, it will eventually "walk off" the mirrors 21 and 23 and be reflected a first time from one of the convex mirrors 29 and 31. Assume this happens at the mirror 31. The beam reflected from mirror 31 will return toward the mirror 21, in part because these two mirrors are substantially concentric (at $C_1$ in FIG. 3). Similar reflections occur at mirrors 29 and 23 because these mirrors are also concentric (at $C_2$ in FIG. 3 ).

The result is that, when the radiation beam "walks off" the two convex mirrors 21 and 23, the combined reflective action of the two concave mirrors 29 and 31 will return the em. beam to the convex mirrors after one or a few subsequent reflections, and the process will repeat itself. One thus obtains a multiply-reflected beam whose envelope includes most of the interior of the optical cavity interior (as in FIG. 2), with bounded and controllable envelope (as in FIG. 1) through the limiting action of the two concave mirrors 29 and 31.

The effect of the apparatus of FIG. 3 is to cause the em. radiation beam to make a multiplicity of passes (of the order of hundreds) across the chamber 12 during the time interval required for a representative charge particle in the beam 43 to move through the photoneutralization region 12. This increases the probability of absorption of photodetachment radiation to a number close to 1.0, as desired. With the photodetachment cross section $\sigma_{ph} \approx 10^{-21}$ cm$^2$ as suggested by FIG. 4, this multiple pass approach is also necessary to obtain decent efficiency (85 percent) for absorption of the photons from the em. radiation.

This effect may be estimated quantitatively as follows. Consider a negative ion current (initial value $I = I_o$) that enters a photoneutralizer is subjected to photoneutralization therein and exits as a substantially unneutralized beam. If the beam is uniformly exposed to electromagnetic radiation of energy $h\nu_L$ and average fluence $\phi_w$ (Watts/cm$^2$), electrons are stripped from the negative ion particles at a rate given approximately by $$\frac{dI}{dt} = v\frac{dI}{dz} = -\rho I,$$

v=beam velocity, $$\rho = \frac{\sigma\phi_w}{h\nu_L},$$

$\sigma$=photodetachment cross section (cm$^2$).

The neutral fraction of the output beam becomes $$\eta = \frac{I(z = z_c)}{I_o} = 1 - \exp\left[-\frac{\sigma}{vh\nu_L}S\right],$$

with $z_c$=em. beam path length in chamber and $$S = \int_0^{z_c} \phi_w dz = \frac{vh\nu_L}{\sigma}\ln\left(\frac{1}{1-\eta}\right).$$

Figure 5:
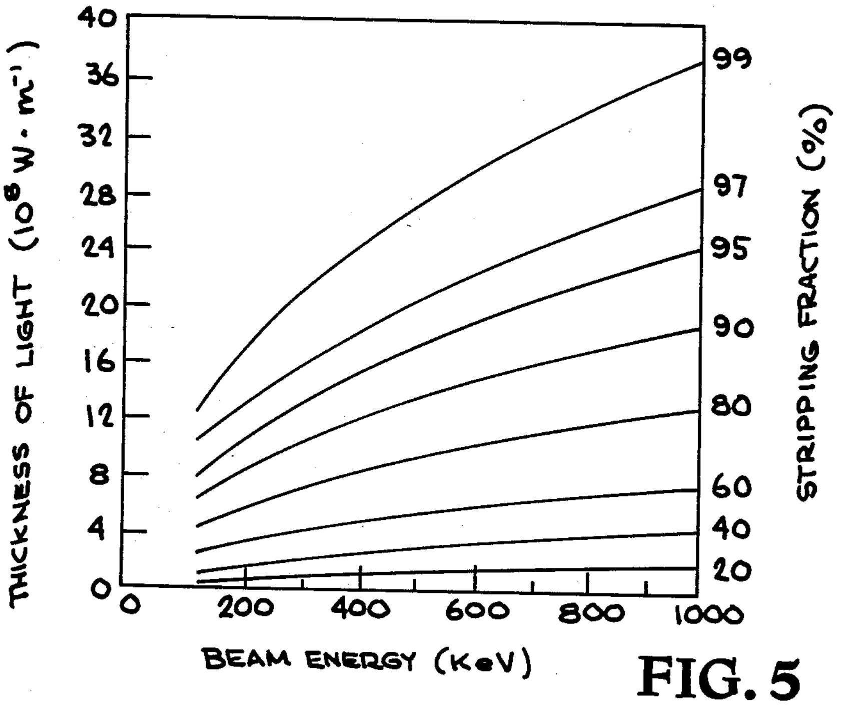
FIG. 5 is a graphical view of photoneutralization fraction of a beam of deuterium negative ions and the corresponding radiant flux thickness, as a function of the deuterium particle kinetic energy.

S is sometimes called the "thickness" of the radiant flux. FIG. 5 graphically presents the neutral fraction $\eta$ attainable from photoneutralization of a beam of negative deuterium ions and corresponding radiant flux thicknesses, as a function of charged particle kinetic energies. For a photoneutralization chamber length $z_p = 100$ cm, attainment of a neutralization fraction $\eta > 0.8$ requires average radiation fluences of $\phi_w$ $5\times10^9$ Watts/cm$^2$ for reasonable charged particle kinetic energies. This cannot be obtained over a chamber length $z_c = 100$ cm with a single pass em. beam; a multiple pass beam, such as is provided by the subject invention, is required.

With reference to FIG. 4, one attractive radiation source for photoneutralization of ions such as $H^-$ and $C^-$ is the gallium arsenide laser, whose wavelength ($\lambda = 0.85$ $\mu$m) approximately matches the wavelength for maximum photodetachment cross section for such ions. Gallium arsenide lasers operate at efficiencies of 10–40 percent at low temperatures, which is another attractive feature. However, such lasers require substantial development at this time; and they utilize a poisonous element (As) that requires special precautions for possible leakage. Ideally, the GaAs laser should be able to operate efficiently at room temperature and with angular divergence of at most a few degrees. These last requirements are not yet attainable with the GaAs laser.

Another attractive radiation source is the atomic iodine photodissociation laser, which may depend upon the laser transition between two low-lying states $5^2P_{\frac{1}{2}} \rightarrow 5^2P_{3/2}$ of atomic iodine to produce radiation of wavelength $\lambda = 1.315$ $\mu$m. The laser transition occurs by reactions such as $$C_3F_7I + h\nu_{pump} \rightarrow C_3F_7 + I^*(\lambda_{pump} \sim 0.27\ \mu\text{m}),$$

$$I^* \rightarrow I + h\nu_L,$$

$$C_3F_7 + I + M \rightarrow C_3F_7I + M.$$

The repetition rate for laser transitions in atomic iodine is limited by the need to replace the iodine-containing gas ($C_nF_{2n+1}I$) to maintain optimum gas conditions; this is due in part to the slow drain from the metastable lower laser state $5^2P_{\frac{1}{2}}$(with associated lifetime $\sim$0.13 msec.), which would otherwise require unreasonably long times for re-establishment of population inversion.

Beam quality in this iodine laser is determined in large part by the acoustic response of the laser system and the time scale of laser pumping. Laser pumping produces a shock wave that propagates inward at a velocity of $V_{sw}$=0.01–0.02 cm/μsec. The laser transition is completed within 10 usec. after pumping begins so that only a small portion of the gain medium volume is disturbed by the said shock wave. Beam quality is also affected by inhomogeneous absorption in the gas, which results in nonuniform gas heating. This generates an acoustic wave that requires 20–40 μsec. to produce a significant disturbance so that only a small portion of the gain medium volume is affected by this acoustic wave.

Pulse duration of an actively mode locked iodine photodissociation laser using pure $C_3F_7I$ is 1–2 nsec.; this duration can be reduced to as low as 100–150 psec. through inclusion of high pressure buffers (e.g., argon of 5-6 atmosphere pressure) in the gain medium.

A portion of the free iodine in the gain medium may form molecular iodine that quenches the laser transition, through reactions such as $$I+I+M \rightarrow I_2+M,$$

$$I_2+I^* \rightarrow I_2^*+I.$$

This would result in an inexorable increase in $I_2$ concentration, if the gain medium gas is not recycled with removal of the $I_2$. Removal of $I_2$ may be achieved by trapping such molecules in liquid phase alkyliodide at temperatures below T=−5° C. This allows large gas flow rates and pulse repetition rates of up to 10 Hz.

The iodine photodissociation laser may be pumped with a low pressure mercury lamp that produces λ=0.254 μm radiation. This pumping is adaptable for CW operation or operation with relatively long pulse durations.

Figure 6:
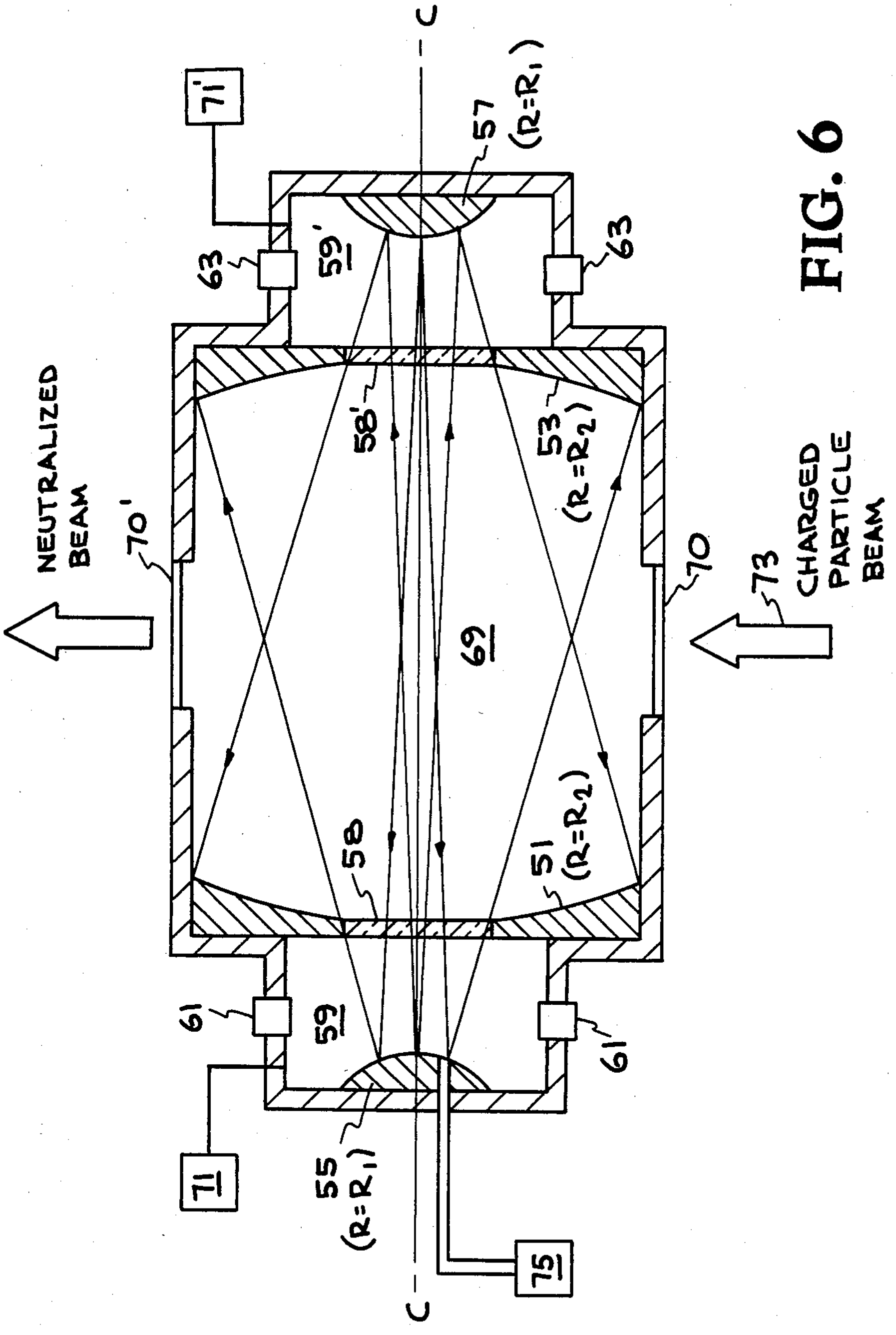
FIG. 6 is a schematic view of a second embodiment of the invention.

A second embodiment, shown in FIG. 6, positions two annular concave mirrors 51 and 53, each of focal length substantially=$R_2$, at coaxial positions on a central axis CC and facing one another as shown. One then positions two convex mirrors 55 and 57, each of focal length substantially=$R_1$ (<$R_2$), at coaxial positions on the axis CC and facing one another such that the order of the elements on CC is 55, 51, 53 and 57, with the mirrors 51 and 57 being spaced apart a distance $R_2$-$R_1$, and the mirrors 53 and 55 also being spaced apart a distance $R_2$-$R_1$. All four mirrors are substantially 100 percent reflecting for em. radiation with predetermined wavelength $\lambda=\lambda_r$, and each mirror may be a portion of a sphere or cylinder of appropriate radius. An optical gain medium cavity 59 (and/or a second such cavity 59') may be positioned between mirrors 51 and 55 and/or between mirrors 53 and 57 as shown, with one or more partially or fully transparent windows 58 and/or 58' and gas inflow/outflow means 61 and/or 63 as a part of the respective cavities 59 and/or 59'; each window should provide a gas-tight seal between the gas cavity and the photoneutralization region or evacuated container 69. The gain medium contained in the gain cavity 59 and/or 59' may be atomic iodine with radiative wavelength $\lambda_r \approx 1.31$ μm or GaAs gas with $\lambda_r \approx 0.85$ μm or other suitable gas with $\lambda_r$ lying between 0.8 μm and 1.5 μm. The photoneutralization region 69 has internal pressure p $10^{-4}$ Torr; and the charged particle beam enters the region 69 through beam input means, such as a port or window 70, positioned adjacent to the working volume 69 between mirrors 51 and 53. Gain medium excitation means 71 and/or 71' are associated with the respective chemical gain medium cavities to excite the gain medium in timed relationship with arrival of the charged particle beam 73 at the entrance window 70. An em. radiation source and input means 75 may be used to generate and introduce into the gain cavity 59 or 59' em. radiation of predetermined wavelength $\lambda_r$, in order to initiate the gain process within the gain cavity.

In all embodiments herein, one seeks to: (a) minimize the (laser) radiation power density at all windows and reflecting surfaces (preferably below five Joules/cm²), to avoid surface or bulk optical damage thereat; and (b) maximize the flow length of the charged particles within the photoneutralization apparatus, to insure high efficiency of electron photodetachment. In FIG. 6, this would probably require that both gain medium cavities 59 and 59' be used for the excitation and amplification purposes.

Figure 7:
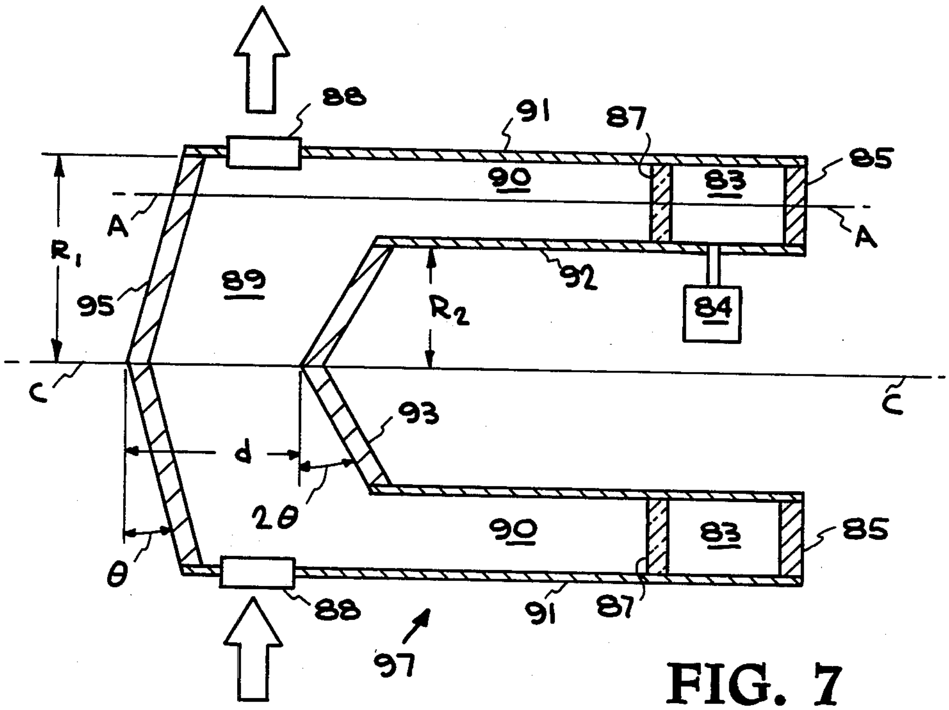
FIG. 7 is a schematic view of a third embodiment, which uses two curved mirrors and at least one planar mirror in a cylindrically symmetric geometry; alternatively, the embodiment uses at least three planar mirrors in a rectangular geometry.

A third embodiment, shown in FIG. 7, uses two coaxial conical mirrors 93 and 95 with respective cone apex half angles $\pi/2-2\theta$ and $\pi/2-\theta$, coaxial and spaced apart from one another, and a coaxial planar mirror 85 of annular shape to provide multi-path irradiation of a working volume 89 between the mirrors 93 and 95. Each of these mirrors is positioned symmetrically about a central axis CC so that the apparatus is substantially cylindrically symmetric about CC. Cylindrical side walls 91 and 92 and the mirrors 85, 93 and 95 form a closed container 97. A closed annular chamber 83 is defined by the mirror 85 (substantially 100 percent reflecting) and by an annular, planar, parallel, partially or fully transparent window 87 that is spaced apart from 85 in the direction of CC; the chamber 83 is filled with an optical gain medium gas that can be excited by excitation means 84 to produce em. radiation of appropriate wavelength $\lambda_r$. The planes of the mirrors 85 and 87 are substantially perpendicular to the axis CC. The chamber 83 and defining mirrors 85 and 87 may function as an optical cavity, and the em. radiation that issues from 83 proceeds down a cylindrical extension or "arm" (an evacuated chamber) 90, along an "axis" AA in a direction substantially parallel to the central axis CC. This radiation is then reflected by the first conical mirror 95, oriented at an angle $\pi/2-\theta$ relative to CC; the once-reflected radiation then proceeds toward a second conical mirror 93, oriented at an angle $\pi/2 - 2\theta$ relative to CC, where the radiation is reflected again and proceeds toward the mirror 95; the radiation (twice-reflected) is again reflected at 95 and proceeds toward the mirror 85, and the process repeats. If the mirrors 95 and 93 have slant heights $R_1 \sec \theta$ and $R_2 \sec 2\theta$, respectively, and these two mirrors are spaced apart a distance d at their apices on the central axis CC, this optical system is most efficient if the relations $$d \sin 2\theta = R_2,$$

$$4d \sin\theta \cos^3\theta = R_1$$

are satisfied. With these choices, the entire mirror 93 is illuminated by em. radiation reflected from the mirror 95, and substantially all radiation reflected from 93 is returned to 95 and reflected toward the planar mirror 85. An input port 88 is provided in the side walls of a working volume 89 (lying oetween the mirrors 93 and 95 as shown) to allow the charged particle beam to enter this volume.

The apparatus shown in FIG. 7 may also be fabricated in a rectangular geometry, whereby each of the two mirrors 93 and the two mirrors 95 is planar, as are each of the two planar mirrors 85 and the two planar windows 87. The geometry is now rectangular, or more generally polygonal, rather than cylindrically symmetric, but in all other respects the apparatus performs substantially the same as does the cylindrical geometry apparatus. The conical or planar mirrors 85 and 87 would normally be spaced apart a predetermined distance $D=N\lambda_r$, where N is a positive integer, if 83 is to function as a resonant optical cavity for the wavelength $\lambda_r$.

Figure 8:
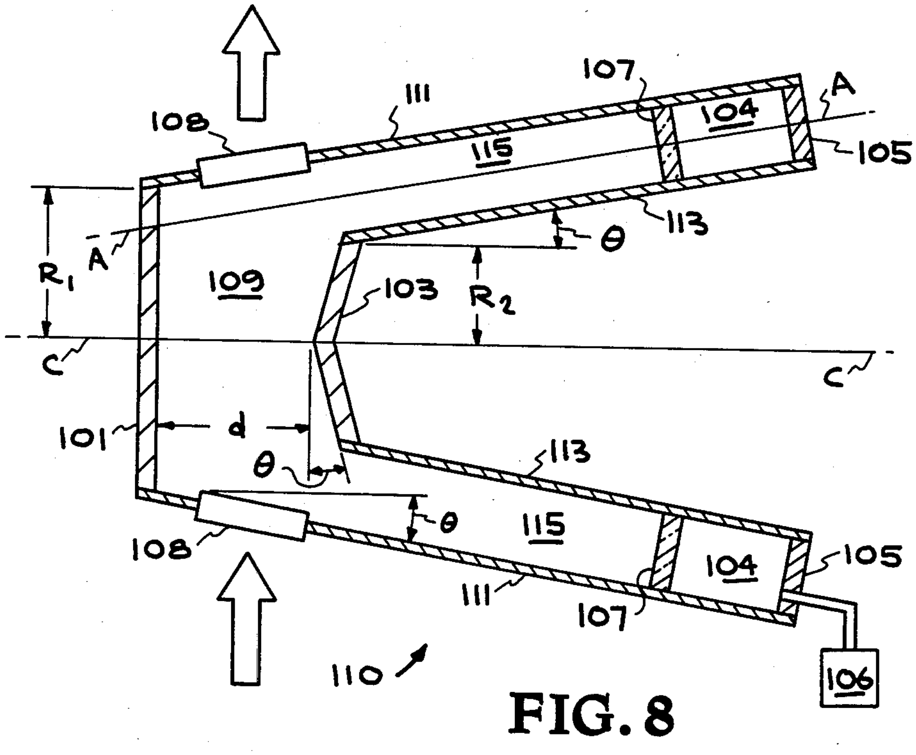
FIG. 8 is a schematic view of a fourth embodiment, which uses a curved mirror and at least two planar mirrors in a cylindrically symmetric, conical geometry; alternatively, the embodiment uses at least three planar mirrors in a rectangular geometry.

FIG. 8 shows a fourth embodiment of the invention, again assumed to be cylindrically symmetric about a central axis CC. One orients a planar mirror 101 substantially perpendicular to CC; and one positions a first conical mirror 103 with cone apex half angle $\pi/2-\theta$ on the axis CC with its apex spaced apart a distance d from the planar mirror 101; 101 and 103 are substantially fully reflecting for wavelengths $\lambda=\lambda_r$. The volume 109 between the mirrors 101 and 103 is the working volume of this apparatus. One positions a second conical mirror 105 of annular shape (substantially fully reflecting for $\lambda=\lambda_r$) so that it is substantially perpendicular to a cone local generator AA that is oriented at an angle $\theta$ relative to CC, as shown in FIG. 8. A partially or fully transparent conical window 107, also of annular shape, is spaced apart from 105 and is also oriented substantially perpendicular to AA as shown. Conical side walls 111 and 113, each defined by a cone with cone apex half angle $\theta$, together with the mirrors 101, 103 and 105, form a closed container 110 with a conical annular extension 115. The conical side walls 111 and 113 are defined by two cones with "common orientation"; that is, the projections of the two cones on any plane containing the axis CC are two adjacent pairs of substantially parallel lines, as shown in FIG. 8. The chamber 104 defined by mirror 105 and window 107 and the side walls 111 and 113 is filled with an optical gain gas medium, and 104 may function as an optical cavity. Electromagnetic radiation of appropriate wavelength $\lambda_r$ is produced in 104 by beam source and input means 106 and is introduced into the chamber 104 and proceeds toward the mirror 101 along a path substantially parallel to the local generator AA. The mirror 101 reflects this radiation toward the conical mirror 103; the mirror 103 reflects this radiation back toward 101, which in turn reflects the radiation back parallel to AA toward 105 and 107 for repetition of the process. The apparatus in FIG. 10 will operate most efficiently if the relations $$R^1=d\tan\theta(1+\sec\theta\sec2\theta),$$

$$R_2=2d\sin\theta\sec2\theta,$$

are satisfied, where $2R_1$ is the diameter of the planar mirror 101 and $R_2\sec\theta$ is the slant height of the conical mirror 103. The charged particle beam enters the working volume 109 through beam input means, such as a port 108.

The apparatus shown in FIG. 8 may also be fabricated in a rectangular geometry rather than a cylindrically symmetric (or conical) geometry as just discussed. In the rectangular geometry, the two mirrors 103 would each be planar, as would each of the two mirrors 105 and the two windows 107. In all other material respects, the rectangular geometry apparatus in FIG. 8 would function substantially as would the conical geometry there. The conical or planar mirror 105 and window 107 would normally be spaced apart a distance $N\lambda_r$, where N is a positive integer, if 104 is to function as a resonant optical cavity for the wavelength $\lambda_r$.

One advantage of each of the embodiments shown in FIG. 10 is that, for a radiation beam leaving a mirror 107 and propagating substantially parallel to the axis AA defining the conical annular extension 115, the optical path length L from 107 to 101 to 103 to 101 to 107 is precisely the same for any point on the window 107. This is also true for the optical path length L of radiation leaving the window 87 in FIG. 7 and propagating substantially parallel to the axis CC along the cylindrical extension 90. Thus, radiation wave fronts that are initially perpendicular to the axis CC in FIG. 7 or to AA in FIG. 8 will preserve this perpendicular character throughout their multiple passes. This property might be used advantageously to provide a second resonance related to propagation of radiation within the apparatus but outside the chamber 104 in FIG. 7 or 8, namely $L=M\lambda_r$, where M is a positive integer. However, this may not be possible if the effective refractive index in the working volume (89 or 109) differs substantially from the effective refractive index in the extension (90 or 115) of the apparatus.

FIGS. 7 and 8 are symmetric about the central axis CC. However, one may also use a smaller portion of this apparatus, say the "half" lying above the central axis CC in either of these FIGS., as the optical paths of the portions lying above and below CC do not overlap In this instance, one would position the port 88 (in FIG. 7) or 108 (in FIG. 8) for the working volume adjacent to the central axis CC.

The foregoing description of a preferred embodiment of the invention is presented for purposes of illustration only and is not intended to limit the invention to the precise form disclosed; modification and variation may be made without departing from what is regarded as scope of the invention.

I claim:

1. Apparatus for photoneutralization of an atomic or molecular beam of negatively charged particles, the apparatus comprising:

an optical cavity including first and second end walls, spaced apart and facing one another and having a longitudinal axis extending therebetween;

first and second, substantially identical, convex mirrors, spaced apart within the optical cavity and facing one another along the optical cavity longitudinal axis, with the first and second convex mirrors being adjacent to but spaced apart from the first and second end walls, respectively;

first and second, substantially identical concave mirrors, positioned at the first end wall and at the second end wall, respectively, within the optical cavity and facing one another along the longitudinal axis of the optical cavity;

an optical gain cavity that includes the first end wall and the first convex mirror;

a photoneutralization region that includes the second end wall and the second convex mirror, with the optical gain cavity being separated from the photoneutralization region by an optical window that provides a substantially gas-tight seal and is transparent to radiation of a predetermined wavelength $\lambda=\lambda_r$;

gas excitation means, operatively associated with the optical gain cavity, to excite a gas contained in this cavity;

optical gain gas source and inflow/outflow means, operatively associated with and adjacent to the optical gain cavity, to make gas available, admit gas into, and allow gas to exit from, the optical gain cavity, where the gas is chosen to permit emission of electromagnetic radiation of wavelength $\lambda_r$ when the gas is excited by the gas excitation means;

an electromagnetic radiation beam source and beam input means, operatively associated with the optical cavity, to produce an electromagnetic radiation beam of wavelength substantially $\lambda_r$ and to direct this beam into the optical cavity substantially parallel to the direction of the optical cavity longitudinal axis; and a charged particle beam source and beam input means, positioned adjacent to the optical cavity and oriented to produce and direct a beam of negatively charged atomic or molecular particles through the photoneutralization region in a direction substantially transverse to the direction of the longitudinal axis of the optical cavity.

2. Apparatus according to claim 1, wherein:

the radiation reflecting surface of each of said convex mirrors is a portion of a sphere or cylinder with radius substantially equal to a predetermined length $R_1$;

the radiation reflecting surface of each of said concave mirrors is a portion of a sphere or cylinder with radius substantially equal to a predetermined length $R_2$, with $R_2<R_1$;

the reflecting surface of said first convex mirror is spaced apart from the reflecting surface of said second concave mirror by a distance of substantially $R_2-R_1$; and the reflecting surface of said second convex mirror is spaced apart from the reflecting surface of said first concave mirror by a distance of substantially $R_2-R_1$.

3. Apparatus according to claim 1, wherein said optical gain gas source is a source of atomic iodine and said predetermined wavelength of said light beam is substantially $\lambda_r=1.31$ μm.

4. Apparatus according to claim 1, wherein said optical gain gas source is a source of gallium arsenide and said predetermined wavelength of said light beam is substantially $\lambda_r=0.85$ μm.

5. Apparatus according to claim 1, wherein said charged particle beam source is a source of negatively charged particle beam source is a source of negatively charged partifles drawn from a class consisting of $H^-$ ions, $C^-$ ions, $0^-$ ions and $0_2^-$ ions.

6. Apparatus for photoneutralization of an atomic or molecular beam of negatively charged particles, the apparatus comprising:

an optical cavity including first and second end walls, spaced apart and facing one another and having a longitudinal axis extending therebetween;

first and second substantially identical convex mirrors, facing one another and being contiguous with the first and second end walls, respectively;

first and second, substantially identical concave mirrors, each with a central aperture therein and spaced apart within the optical cavity along the longitudinal axis and facing one another, with the first and second concave mirrors being spaced apart from the first and second convex mirrors, respectively;

an optical gain cavity that includes the first convex mirror;

a photoneutralization region extending between the first and second concave mirrors, with the optical gain cavity being separated from the photoneutralization region by an optical window, positioned in the central aperture of the first concave mirror, the optical window being substantially transparent to electromagnetic radiation of a predetermined wavelength $\lambda=\lambda_r$ and providing a substantially gas-tight seal;

gas excitation means, operatively associated with the optical gain cavity, to excite a gas contained in the cavity;

optical gain gas source and gas inflow/outflow means, operatively associated with and adjacent to the optical gain cavity, to make gas available, admit gas into, and allow gas to exit from, the optical gain cavity, where the gas is chosen to permit emission of electromagnetic radiation of wavelength $\lambda_r$ when the gas is excited Dy the gas excitation means;

an electromagnetic radiation beam source and beam input means, operatively associated with the optical cavity, to produce an electromagnetic radiation beam of wavelength substantially $\lambda_r$ and to direct this beam into the optical cavity substantially parallel to the direction of the optical cavity longitudinal axis; and a charged particle beam source and beam input means, positioned adjacent to the optical cavity and oriented to produce and direct a beam of negatively charged atomic or molecular particles through the photoneutralization region in a direction substantially transverse to the direction of the longitudinal axis of the optical cavity.

7. Apparatus according to claim 6, wherein:

the radiation reflecting surface of each of said convex mirrors is a portion of a sphere or cylinder with radius substantially equal to a first predetermined length $R_1$;

the radiation reflecting surface of each of said concave mirrors is a portion of a sphere or cylinder with radius substantially equal to a second predetermined length $R_2$, with $R_1>R_2$;

the reflecting surface of said first convex mirror is spaced apart from the reflecting surface of said second concave mirror by a distance of substantially $R_1-R_2$; and the reflecting surface of said second convex mirror is spaced apart from the reflecting surface of said first concave mirror by a distance of substantially $R_1-R_2$.

8. Apparatus according to claim 6, further including:

a second optical gain cavity that includes said second convex mirror, with the second optical gain cavity being separated from said photoneutralization region by a second optical window, positioned in the central aperture of said second concave mirror, the second optical window being substantially transparent to electromagnetic radiation of a predetermined wavelength $\lambda=\lambda_r$ and providing a substantially gas-tight seal; and second optical gain gas source and gas inflow/outflow means, operatively associated with and adjacent to the second optical gain cavity, to provide gas for, admit gas into, and allow gas to exit from, the second optical gain cavity, where the gas is chosen to permit emission of electromagnetic radiation of wavelength $\lambda=\lambda_r$ when the gas is excited.

9. Apparatus according to claim 6, wherein said optical gain gas source is a source of atomic iodine and said predetermined wavelength of said light beam is substantially $\lambda_r=1.31$ $\mu$m.

10. Apparatus according to claim 6, wherein said optical gain gas source is a source of gallium arsenide and said predetermined wavelength of said light beam is substantially $\lambda_r=0.85$ $\mu$m.

11. Apparatus according to claim 6, wherein said charged particle beam source is a source of negatively charged particles drawn from a class consisting of $H^-$ ions, $C^-$ ions, $O^-$ ions and $O_2^-$ ions.

12. Apparatus for photoneutralization of an atomic or molecular beam of negatively charged particles, the apparatus comprising:

an optical gain cavity having two substantially parallel end walls spaced apart with a longitudinal axis therebetween;

a first planar mirror, substantially fully reflecting for electromagnetic radiation of predetermined wavelength $\lambda=\lambda_r$, positioned at the first end wall of the gain cavity;

a planar window, at least partially transparent to electromagnetic radiation of wavelength $\lambda_r$, positioned at the second end wall of the gain cavity so that the window and the first mirror face one another along the longitudinal axis of the optical gain cavity;

a second planar mirror, spaced apart from the optical gain cavity and positioned so that the planar window is positioned between the first and second planar mirrors, with the plane of the second mirror being oriented to receive and reflect, in a direction different from that of the optical gain cavity longitudinal axis, any electromagnetic radiation issuing from the optical gain cavity and propagating substantially parallel to the optical gain cavity longitudinal axis, and the second mirror being substantially fully reflecting for electromagnetic radiation of wavelength $\lambda_r$;

a third planar mirror generally facing the second mirror and being spaced apart therefrom so that electromagnetic radiation that propagates parallel to the optical gain cavity longitudinal axis toward the second mirror and is reflected from the second mirror, will proceed toward the third mirror and will be reflected at substantially perpendicular incidence by the third mirror;

an optical cavity including the optical gain cavity and the first and second planar mirrors;

gas excitation means, operatively associated with the optical gain cavity, to excite a gas contained in this cavity;

optical gain gas source and gas inflow/outflow means, operatively associated with and adjacent to the optical gain cavity, to provide gas, to admit gas into and to allow gas to exit from the optical gain cavity, where the gas is chosen so that it emits electromagnetic radiation of wavelength $\lambda_r$ when the gas is excited by the gas excitation means;

an electromagnetic radiation beam source and beam input means, operatively associated with the optical cavity, to produce an electromagnetic radiation beam of wavelength substantially $\lambda=\lambda_r$ and to direct this radiation beam into the optical cavity substantially parallel to the optical gain cavity longitudinal axis; and a charged particle beam source and beam input means, positioned adjacent to the optical cavity and oriented to produce and direct a beam of negatively charged atomic or molecular particles through the optical cavity in a direction substantially transverse to the direction of the optical gain cavity longitudinal axis.

13. Apparatus according to claim 12, wherein the normals to the planes of said second and third mirrors are oriented at angles $\theta$ and $2\theta$, respectively, relative to the direction of the gain cavity longitudinal axis, with $\theta$ a predetermined angle oetween $\theta$ and $\pi/4$ radians.

14. Apparatus according to claim 13, wherein said second mirror has a predetermined length $R_1$, said third mirror has a predetermined length $R_2$ and said second and third mirrors are spaced apart a predetermined distance d, in a common plane including the optical gain cavity longitudinal axis, and these dimensions are related by the relations $R_1=4d \sin\theta \cos^3\theta$ and $R_2=d \sin2\theta$.

15. Apparatus according to claim 13, wherein said second mirror has a predetermined length $R_1$, said third mirror has a predetermined length $R_2$ and said second and third mirrors are spaced apart a predetermined distance d, in a common plane including the optical gain cavity longitudinal axis, and these quantities are related by the relations $R_1=d \tan\theta(1+\sec\theta\sec2\theta)$ and $R_2=2d \sin\theta\sec^3\theta \sec2\theta$.

16. Apparatus according to claim 12, wherein said optical gain gas source is a source of atomic iodine and said predetermined wavelength is substantially $\lambda_r=1.31$ $\mu$m.

17. Apparatus according to claim 12, wherein said optical gain has source is a source of gallium arsenide and said predetermined wavelength is substantially $\lambda_r=0.85$ $\mu$m.

18. Apparatus according to claim 12, wherein said charged particle beam source is a source of negatively charged particles drawn from a class consisting of $H^-$ ions, $C^-$ ions, $O^-$ ions and $O_2^-$ ions.

19. Apparatus for photoneutralization of an atomic or molecular beam of negatively charged particles, the apparatus comprising:

an optical gain cavity of generally annular shape, defined by the volume between two coaxial right cylinders of radii $R_1$ and $R_2$, with $R_1<R_2$;

a substantially planar mirror of generally annular shape, positioned at a first end of the optical gain cavity, that is substantially fully reflecting for electromagnetic radiation of predetermined wavelength $\lambda=\lambda_r$;

a planar window of generally annular shape, positioned at a second end of the optical gain cavity, that is at least partially transparent for electromagnetic radiation of wavelength $\lambda_r$;

a first substantially conical mirror whose axis is substantially coincident with the common cylinder axis, spaced apart from and positioned substantially facing the optical gain cavity along a line parallel to the common cylinder axis so that the planar window is positioned between the planar mirror and the first conical mirror, with the plane of the first conical mirror being oriented to receive and reflect, in a direction different from that of the common cylinder axis, any electromagnetic radiation issuing from the planar window and propagating substantially parallel to the common cylinder axis, with the first conical mirror being substantially fully reflecting for electromagnetic radiation of wavelength $\lambda_r$;

a second substantially conical mirror wnose axis is substantially coincident with the common cylinder axis, spaced apart from and positioned substantially facing the first conical mirror, with the plane of this second conical mirror being oriented to receive and reflect at perpendicular incidence any electromagnetic radiation that issues from the optical gain cavity, propagates substantially parallel to the common cylinder axis and is reflected by the first conical mirror, with this second conical mirror being substantially fully reflecting for electromagnetic radiation of wavelength $\lambda_r$;

an optical cavity including the optical gain cavity and the first and second conical mirrors;

gas excitation means, operatively associated with the optical gain cavity, to excite a gas contained in this cavity;

an optical gain gas source and gas inflow/outflow means, operatively associated with and adjacent to the optical gain cavity, to provide optical gain gas, to admit gas into, and to allow gas to exit from, the optical gain cavity, where the gas is chosen to permit emission of electromagnetic radiation of wavelength $\lambda_r$ when the gas is excited by the gas excitation means;

an electromagnetic radiation beam source and beam input means to produce an electromagnetic radiation beam of wavelength substantially $\lambda_r$ and to direct this radiation beam into the optical cavity in a direction substantially parallel to the common cylinder axis;

a charged particle beam source and beam input/output means, positioned adjacent to the optical cavity and oriented to produce and direct a beam of negatively charged atomic or molecular particles through the optical cavity in a direction substantially transverse to the direction of the common cylinder axis.

20. Apparatus according to claim 19, wherein the cone apex half angles of said first and second conical mirrors are substantially $\pi/2-\theta$ and $\pi/2-2\theta$, respectively, where $\theta$ is a predetermined number between 0 and $\pi/4$ radians.

21. Apparatus according to claim 20, wherein said first conical mirror has a predetermined slant height $R_1 \sec\theta$, said second conical mirror has predetermined slant height $R_2 \sec 2\theta$, said apices of said first and second conical mirrors are spaced apart a predetermined distance d, and these dimensions satisfy the relations $R_1=4d \sin\theta \cos^3\theta$ and $R_2=d \sin 2\theta$.

22. Apparatus according to claim 19, wherein said optical gain gas source is a source of atomic iodine and said predetermined wavelength is substantially $\lambda_r=1.31$ μm.

23. Apparatus according to claim 19, wherein said optical gain gas source is a source of gallium arsenide and said determined wavelength is substantially $\lambda_r=0.85$ μm.

24. Apparatus according to claim 19, wherein said charged particle beam source is a source of negatively charged particles drawn from a class consisting of $H^-$ ions, $C^-$ ions, $O^-$ ions and $O_2^-$ ions.

25. Apparatus for photoneutralization of an atomic or molecular beam of negatively charged particles, the apparatus comprising:

an optical gain cavity of generally annular shape, defined by the volume between two cones that are spaced apart and nave the same cone apex half angle $\theta$, with $0<\theta<\pi/4$ radians, the two cones having a common cone axis and common orientation;

a first substantially conical mirror of generally annular shape, positioned at and defining a first end wall of the optical gain cavity, that is substantially fully reflecting for electromagnetic radiation of predetermined wavelength $\lambda=\lambda_r$;

a substantially conical window, positioned at and defining a second end wall of the optical gain cavity, that is at least partially transparent for electromagnetic radiation of wavelength $\lambda_r$, with the first conical mirror and the conical window facing one another and the local normals to the surfaces of the first conical mirror and of the conical window each being substantially parallel to the local generators of the two cones that define the optical gain cavity;

a substantially planar mirror, spaced apart from and positioned substantially facing the optical gain cavity along lines parallel to the local normal to the surface of the first conical mirror so that the conical window is positioned between the first conical mirror and the planar mirror, with the plane of the planar mirror being oriented to receive and reflect, in a direction different from that of the local normal to the surface of the first conical mirror, any electromagnetic radiation issuing from the optical gain cavity and propagating substantially parallel to this local normal, with the planar mirror being substantially fully reflecting for electromagnetic radiation of wavelength $\lambda_r$;

a second substantially conical mirror, spaced apart from and positioned substantially facing the planar mirror and having cone half angle substantially $\pi/2-\theta$, with the first and second conical mirrors having substantially coincident cone axes and these cone axes being substantially perpendicular to the plane of the planar mirror and with the second conical mirror being oriented to receive and reflect at perpendicular incidence any electromagnetic radiation that issues from the optical gain cavity, propagates substantially parallel to the local normal to the surface of the first conical mirror, and is reflected by the planar mirror, with the second conical mirror being substantially fully reflecting for electromagnetic radiation of wavelength $\lambda_r$;

an optical cavity including the optical gain cavity, the planar mirror and the second conical mirror;

gas excitation means, operatively associated with the optical gain cavity, to excite a gas contained in this cavity;

an optical gain gas source and gas inflow/outflow means, operatively associated with and adjacent to the chemical gain medium cavity, to provide gas for, to admit gas into and allow gas to exit from the optical gain medium cavity, where the gas is chosen to emit electromagnetic radiation of wavelength $\lambda_r$ when the gas is excited by the gas excitation means;

an electromagnetic radiation beam source and beam input means, operatively associated with the optical cavity, to produce an electromagnetic radiation beam of wavelength substantially $\lambda_r$ and to direct this radiation beam into the optical cavity substantially parallel to the direction of the optical gain cavity longitudinal axis; and a charged particle beam source and beam input means, positioned adjacent to the optical cavity to produce and direct a beam of negatively charged atomic or molecular particles through the optical cavity in a direction substantially transverse to the direction of the optical gain cavity longitudinal axis.

26. Apparatus according to claim 25, wherein said planar mirror has a predetermined height $R_1$, said second conical mirror has predetermined slant height $R_2$sec0, said planar mirror and said apex of said second conical mirrors are spaced apart a predetermined distance d, and these dimensions satisfy the relations $R_1 = d \tan\theta(1+\sec\theta \sec 2\theta)$ and $R_2 = 2d \sin\theta \sec^3\theta \sec 2\theta$.

27. Apparatus according to claim 25, wherein said optical gain gas source is a source of atomic iodine and said predetermined wavelength is substantially $\lambda_r = 1.31$ μm.

28. Apparatus according to claim 25, wherein said optical gain gas source is a source of gallium arsenide and said predetermined wavelength is substantially $\lambda_r = 0.85$ μm.

29. Apparatus according to claim 25, wherein said charged particle beam source is a source of negatively charged particles drawn from a class consisting of $H^-$ ions, $C^-$ ions, $O^-$ ions and $O_2^-$ ions.

* * * * *